(12) United States Patent
Kim et al.

(10) Patent No.: US 8,799,818 B2
(45) Date of Patent: Aug. 5, 2014

(54) CONTENT SEARCH METHOD AND MOBILE TERMINAL HAVING CONTENT SEARCH FUNCTION

(75) Inventors: Jong Hwan Kim, Seoul (KR); Tae Jin Lee, Incheon (KR)

(73) Assignee: LG Electronics Inc., Seoul (KR)

( * ) Notice: Subject to any disclaimer, the term of this patent is extended or adjusted under 35 U.S.C. 154(b) by 790 days.

(21) Appl. No.: 11/951,302

(22) Filed: Dec. 5, 2007

(65) Prior Publication Data

US 2008/0134091 A1      Jun. 5, 2008

(30) Foreign Application Priority Data

Dec. 5, 2006   (KR) .................. 10-2006-0122004

(51) Int. Cl.
*G06F 3/048* (2013.01)
*G06F 3/041* (2006.01)
*G06F 17/30* (2006.01)

(52) U.S. Cl.
CPC ............... *G06F 3/041* (2013.01); *G06F 17/30* (2013.01)
USPC .......................................... 715/831; 715/825

(58) Field of Classification Search
CPC ................... G06F 3/041; G06F 17/30
USPC .................................. 715/825, 831
See application file for complete search history.

(56) References Cited

U.S. PATENT DOCUMENTS

| 6,085,196 | A | * | 7/2000 | Motoyama et al. | .................... 1/1 |
| 6,104,334 | A | * | 8/2000 | Allport | .................... 341/175 |
| 6,148,294 | A | * | 11/2000 | Beyda et al. | .................... 1/1 |
| 6,192,367 | B1 | * | 2/2001 | Hawley et al. | ................ 707/621 |
| 6,483,913 | B1 | * | 11/2002 | Smith | ................ 379/368 |
| 6,775,298 | B1 | * | 8/2004 | Aggarwal | ................ 370/473 |
| 7,509,321 | B2 | * | 3/2009 | Wong et al. | .................... 1/1 |
| 2003/0177113 | A1 | * | 9/2003 | Wakita | .................... 707/3 |
| 2005/0097595 | A1 | | 5/2005 | Lipsanen et al. | |
| 2005/0228836 | A1 | * | 10/2005 | Bacastow et al. | ............. 707/204 |
| 2006/0015808 | A1 | * | 1/2006 | Shiozawa et al. | ............. 715/512 |
| 2006/0019717 | A1 | * | 1/2006 | Gong | ............. 455/566 |
| 2006/0238517 | A1 | | 10/2006 | King et al. | |
| 2007/0162872 | A1 | * | 7/2007 | Hong et al. | ................ 715/828 |
| 2008/0034006 | A1 | * | 2/2008 | Lee | ................ 707/200 |
| 2008/0243806 | A1 | * | 10/2008 | Dalal | ................ 707/5 |

FOREIGN PATENT DOCUMENTS

| CN | 1266233 | 9/2000 |
| CN | 1429046 | 7/2003 |
| CN | 1455611 | 11/2003 |
| CN | 1726693 | 1/2006 |
| DE | 19917169 | 11/2000 |
| JP | 2002202844 A | * 7/2002 |
| WO | 2006/012316 A2 | 2/2006 |

OTHER PUBLICATIONS iPOD Manual [online], in the Internet: URL: http://manuals.info.apple.com/de_DE/iPOD_Fifth_GenFunktionshandbuck.pdf?bcsi_scan_1BCF1BFBAB29F959=JaOPAKpHeM2Gf097bONwuWAAAAC14oAZ&bcsi_scan_filename=iPOD_Fifth_GenFunktionshandbuch.pdf.

* cited by examiner

*Primary Examiner* — William Bashore
*Assistant Examiner* — Gregory A Distefano
(74) *Attorney, Agent, or Firm* — Lee, Hong, Degerman, Kang & Waimey

(57) ABSTRACT

A method and a terminal for displaying content in a mobile terminal is disclosed. The method includes displaying a first content list collectively including a plurality of different content types, receiving a request from a user, and displaying responsive to the request a second content list which only includes content items comprising a content type which is associated with the request.

17 Claims, 9 Drawing Sheets

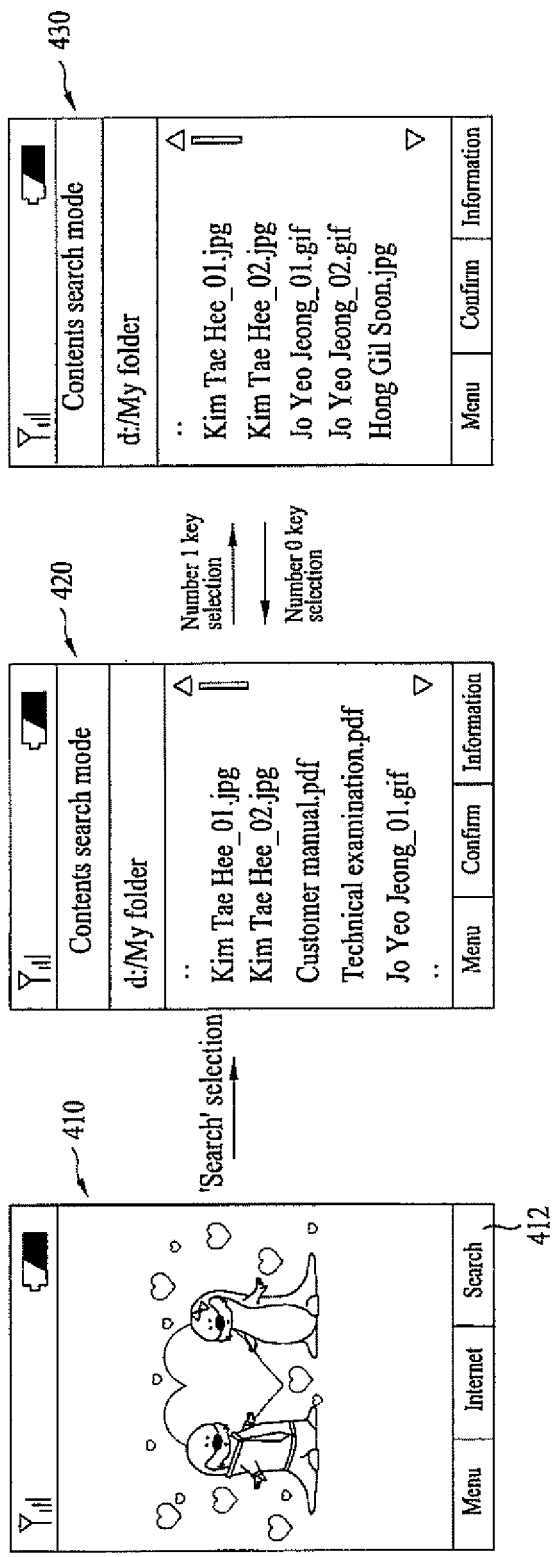

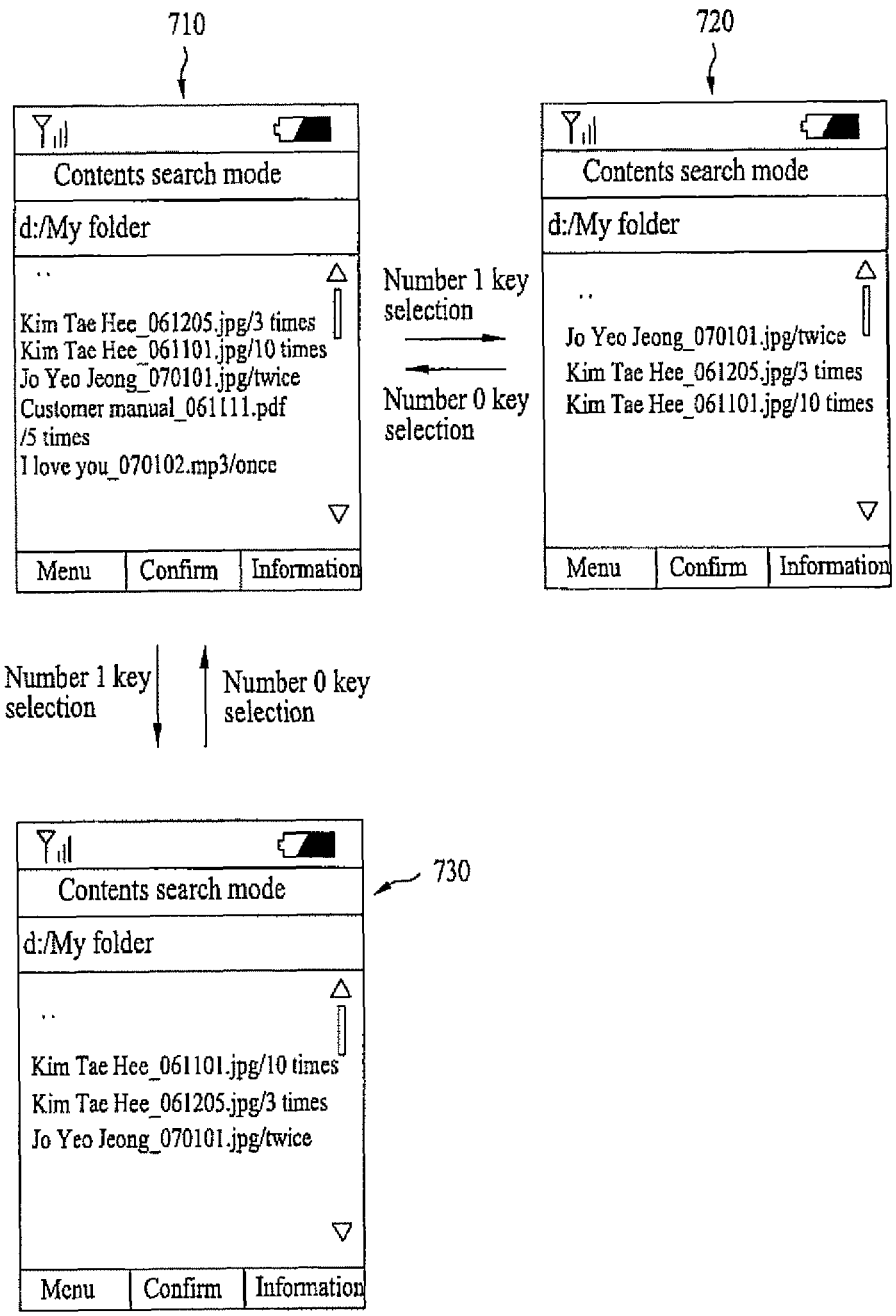

CONTENT SEARCH METHOD AND MOBILE TERMINAL HAVING CONTENT SEARCH FUNCTION

Pursuant to 35 U.S.C. §119(a), this non-provisional patent application claims the priority benefit of Korean Patent Application No. 10-2006-0122004, filed on Dec. 5, 2006, the entire contents of which are hereby incorporated by reference.

FIELD OF THE INVENTION

The present invention is directed to a method for displaying content in a mobile terminal.

DESCRIPTION OF RELATED ART

In a conventional terminal, content is stored in a memory and is searched for in the manner listed below. The term 'content' includes data stored in the terminal, such as multimedia data.

When a specific menu item is selected, the mobile terminal displays a list of contents stored in the area of the selected menu item.

For example, when a 'photo album' is selected from among menu items, the terminal displays a list of one or more photographs stored in the photo album folder. When a 'moving picture album' is selected from among the menu items, the mobile terminal displays a list of one or more moving pictures stored in the moving picture album folder.

As mentioned above, in the content search process, a conventional mobile terminal provides a list of the contents stored in the area of a menu item selected from among one or more preset menu items.

For this reason, in order to search for content having a specific content type, the user is burdened with having to check the contents stored in each menu item.

SUMMARY OF THE INVENTION

In one general aspect of the present invention, a method for displaying content in a mobile terminal includes displaying a first content list collectively including a plurality of different content types, receiving a request from a user, and displaying responsive to the request a second content list which only includes content items comprising a content type which is associated with the request.

It is contemplated that the request includes user input via a key associated with the mobile terminal. It is further contemplated that the key is associated with at least one of the plurality of different content types.

It is contemplated that displaying the second content list includes content filtering.

It is contemplated that the method further includes filtering contents stored on the mobile terminal responsive to the request to define the second content list. It is further contemplated that method includes displaying at least one function associated with the selected key input.

It is contemplated that displaying the second content list further includes displaying the list in order of one of the most recent time of content execution and frequencies of content execution.

It is contemplated that the plurality of different content types includes at least one of a photograph, music, moving picture, download, document, and a non-executable type. It is further contemplated that displaying the second content list includes at least one of a Picture In Picture (PIP) mode, a pop-up mode and an On Screen Display (OSD) mode.

It is contemplated that the method further includes transitioning from a first screen displayed on a display of the mobile terminal to a content display screen responsive to the receiving of the request.

In another general aspect of the present invention, a method for displaying content in a mobile terminal, the method includes receiving a first request from a user, displaying on a display of the mobile terminal a menu comprising a content display option, receiving a second request from the user requesting the content display option, and displaying on the display responsive to the second request a requested content list which only includes content items comprising a content type which is associated with the first request.

In another general aspect of the present invention, a mobile terminal includes an input unit configured to receive a user's input request, a display, and a controller configured to receive a request from the input unit, causing the display to display responsive to the request a second content list which only includes content items comprising a content type which is associated with the request.

In still another general aspect of the present invention, a mobile terminal includes an input unit configured to receive a user's input request, a display, and a controller configured to receive a first request from the input unit, receive a second request from the input unit responsive to the second request, causing the display to display a requested content list which only includes content items comprising a content type which is associated to the first request.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

FIG. 4A depicts various displays displaying content lists in a content search mode according to an embodiment of the present invention.

FIG. 7 depicts various displays displaying content lists depending on the most recent time of content execution or frequencies of contents execution.

DETAILED DESCRIPTION OF PREFERRED EMBODIMENTS

In the following detailed description reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
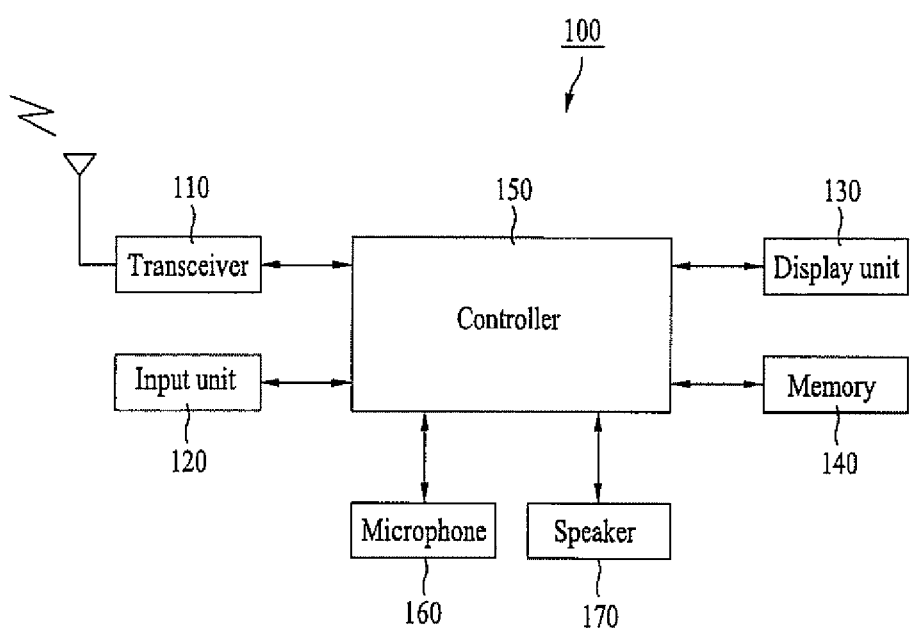
FIG. 1 is a block diagram of a mobile terminal having a content search function in accordance with an embodiment of the present invention.

FIG. 1 is a block diagram of a mobile terminal having a content search function. As illustrated in FIG. 1, the mobile terminal 100 comprises a transceiver 110, input unit 120, display unit 130, memory 140, controller 150, microphone 160, and speaker 170.

The transceiver 110 transmits and receives data with an external mobile terminal or server via a base station under control of the controller 150. The data includes voice data based on call connection and data based on message transmission/reception, which may be multimedia data. The multimedia data includes various types of data such as music, a photograph/picture, a moving picture, a flash, and a document.

The input unit 120 receives an input from the user of the mobile terminal 100 and generates a corresponding signal. The input unit 120 includes one or more keys for inputting a number, character, symbol, direction keys, a scroll key, a jog shuttle, a jog dial, etc. The input unit 120 may also include a touch screen or touch pad.

The display unit 130 displays various information related to the mobile terminal 100 under the control of the controller 150.

The memory 140 stores data and programs necessary for operation of the mobile terminal 100. In particular, the memory 140 stores content such as data stored at time of manufacture, received and stored from an external terminal or server, or created and stored locally by the mobile terminal 100.

The controller 150 controls the operation of the mobile terminal 100, and controls the above-mentioned supporting elements 110, 120, 130, 140, 160 and 170, wherein they can be separately operated.

In an embodiment of the present invention, when any one of the above-stated one or more keys is selected, the controller 150 acts to control the display unit 130 to display a listing of the content having a content type mapped to the selected key, using key mapping information by content types.

The key mapping information by content types is information regarding which key is mapped to each content type, and is set in the mobile terminal 100 as a default or may be set by the user.

Figure 2:
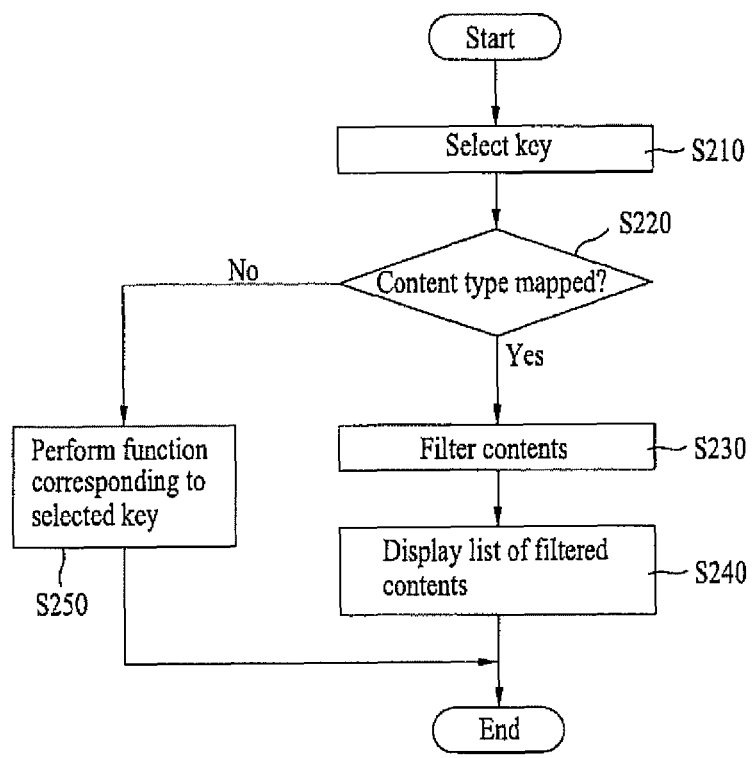
FIG. 2 is a flowchart illustrating a contents search process according to an embodiment of the present invention.

A content search method will hereinafter be described in detail with reference to FIG. 2, which is a flowchart illustrating a content search process. Consider that the content search process is performed in the mobile terminal 100.

Figure 6:
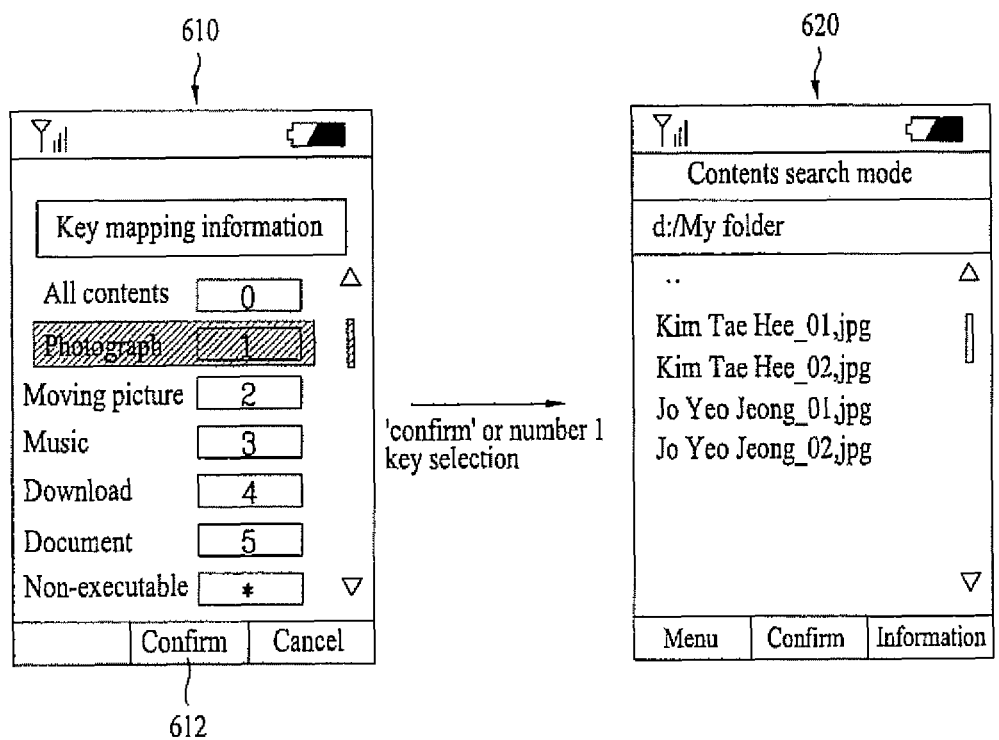
FIG. 6 depicts displays displaying key mapping information by content types.

The mobile terminal 100 receives a key selected by the user (S210). With reference to FIG. 6, a description will be given of a process of displaying the key mapping information by content types before the key selection step S210.

Before key selection S210, in order to provide the user with information regarding which key is mapped to a particular content type to be selected by the user, as illustrated in FIG. 6, the mobile terminal 100 displays the key mapping information by content types on the screen (610). Therefore, the user can select a desired content type based on the displayed key mapping information by content types.

Content types include photograph, music, moving picture, downloads, documents, non-executable types, etc. These content types can be distinguished from one another using file extensions of their respective contents.

Returning to FIG. 2, the mobile terminal 100 determines whether there is a content type mapped to the selected key, using the stored key mapping information by content (S220).

For example, there may be one or more content types mapped to the selected key. Where the selected key is a number 1 key, there may be music or music and moving pictures contents mapped to the number 1 key.

Provided that the user selects a specific key using the key mapping information by content types displayed on the screen, the determination step S220 may be omitted because the user will select a key mapped with a desired content type based on the key mapping information by content types.

Upon determining that there is a content type mapped to the selected key, the mobile terminal 100 filters one or more contents having the selected content type mapped (S230).

For example, assume that photograph content type is mapped to the number 1 key, moving picture content type to a number 3 key, and music content type is mapped to a number 5 key. The mobile terminal 100 can filter contents of the photograph type when the number 1 key is selected, contents of the moving picture content type when the number 3 key is selected, and contents of the music content type when the number 5 key is selected.

Then, the mobile terminal 100 displays a list of the filtered contents on the screen (S240). For example, the mobile terminal 100 can display the list on the entire screen. Alternatively, the mobile terminal 100 may display the list on a portion of the screen using at least one of a Picture In Picture (PIP) mode, pop-up mode, and On Screen Display (OSD) mode.

With reference to FIG. 7, a description will hereinafter be given of a process of displaying content lists depending on the most recent time of content execution or frequencies of content execution (710).

The mobile terminal 100 can display the list of the filtered content in the order of the most recent time of content execution (720). Alternatively, the mobile terminal 100 may display the list of the filtered content in the order of higher frequencies of execution of the content (730).

In another example, the mobile terminal 100 can determine whether the time that the selected key is pressed is greater than or equal to a reference time, and display a list of all the content having the content type mapped to the selected key when the selected time is greater than or equal to the reference time. The mobile terminal then displays a list of a predetermined number of contents among the content having the content type mapped to the selected key in the order of the most recent time of content execution or higher frequencies of execution when the pressed time is smaller than the reference time.

Alternatively, if it is determined that there is no content type mapped to the selected key, the mobile terminal 100 performs a function corresponding to the selected key (S250).

Figure 3:
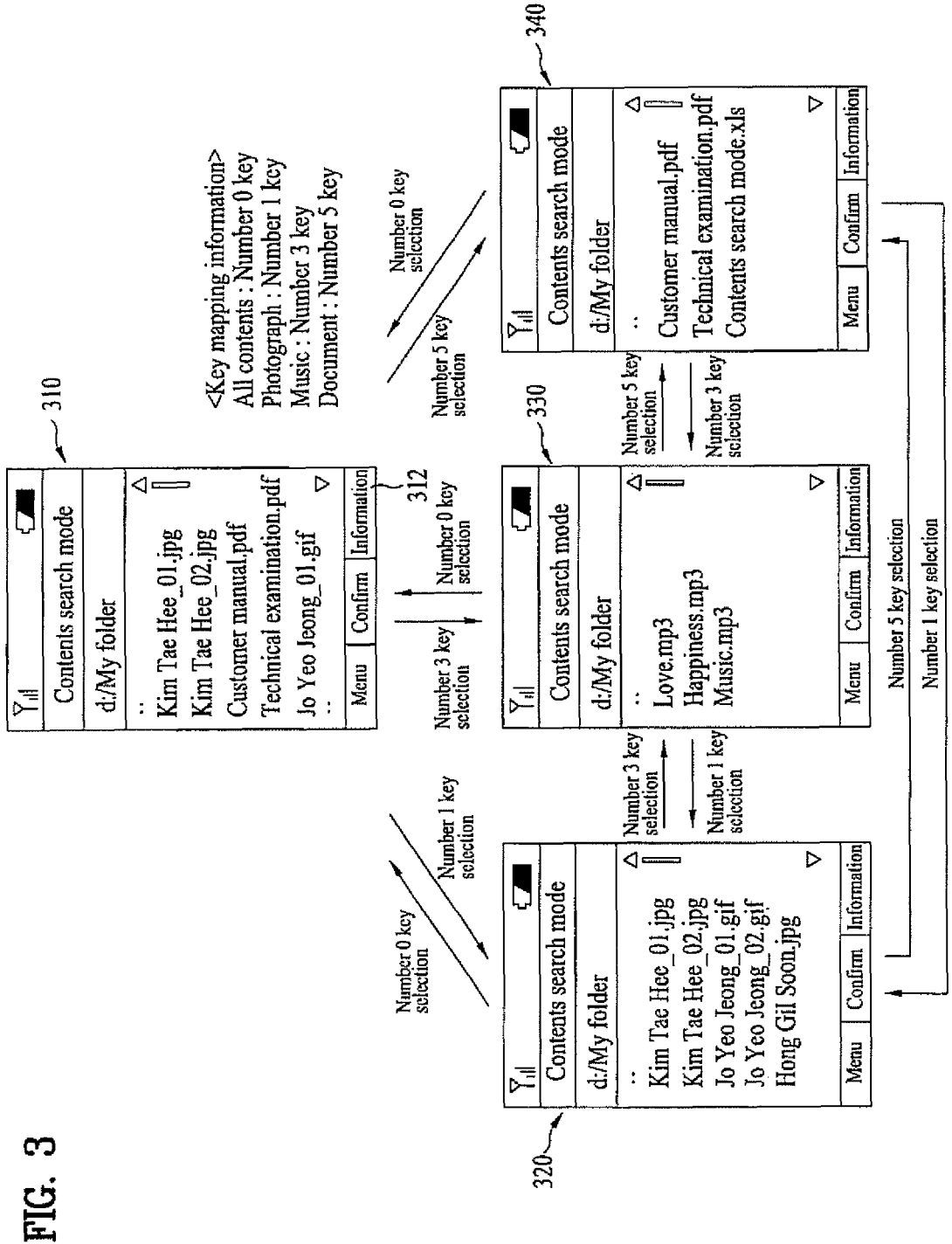
FIG. 3 depicts various displays displaying content lists by content types based on key selections according to an embodiment of the present invention.

With reference to FIG. 3, a detailed description will hereinafter be given of a process of displaying contents lists by content types based on key selection.

First, consider that all the content types are mapped to a number 0 key, the photograph type to the number 1 key, the music type to the number 3 key, and the document type to the number 5 key. In this example, the mobile terminal 100 is in a content search mode.

When the number 1 key is selected in a state 310, the mobile terminal 100 displays a list of the contents of the photograph type mapped to the number 1 key, among all the contents displayed on the screen (320).

When the number 3 key is selected in the state 310, the mobile terminal 100 displays a list of contents of the music type mapped to the number 3 key, among all the contents displayed on the screen (330).

When the number 5 key is selected in the state 310, the mobile terminal 100 displays a list of content of the document type mapped to the number 5 key, among all the contents displayed on the screen (340).

When 'information' 312 on a bottom portion of the screen is activated in the state 310, the mobile terminal 100 can display information about content where a cursor is currently located or a highlighted content. For example, in the case where this content is 'Kim Tae Hee_01.jpg', the information includes date of creation, memory capacity, last execution date, storage location, etc. for the 'Kim Tae Hee_01.jpg' content.

Alternatively, when the number 0 key is selected in any one of the states 320, 330 and 340, the mobile terminal 100 displays a list of contents of all the content types mapped to the number 0 key (310).

Also, where the number 3 key or number 5 key is selected in the state 320, the mobile terminal 100 can display the list of the contents of the music type mapped to the number 3 key (330) or display the list of the contents of the document type mapped to the number 5 key (340).

With reference to FIG. 4A, a detailed description will hereinafter be given of a process of displaying content lists in the content search mode.

When a search key 412 is selected in a standby screen state 410, the mobile terminal 100 enters the contents search mode and displays a list of contents of all content types on the screen (420).

The mobile terminal 100 is preset to display the list of the content of all the content types upon entering the content search mode. Alternatively, the user may set the mobile terminal 100 to display a list of content of a specific content type when the mobile terminal 100 has entered the content search mode.

When the number 1 key is selected in the state 420, the mobile terminal 100 displays a list of content of the photograph type mapped to the number 1 key on the screen (430).

Conversely, when the number 0 key is selected in the state 430, the mobile terminal 100 returns to the state 420, displaying a list of all content types on the screen.

Figure 4B:
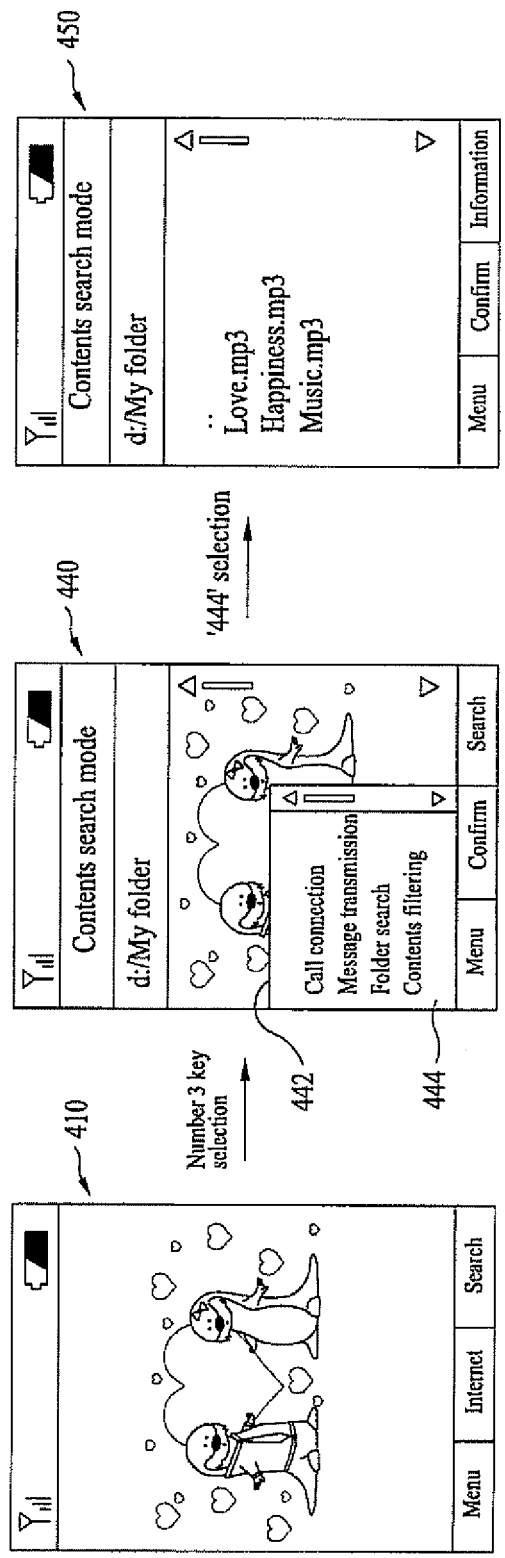
FIG. 4B depicts various displays displaying a content list through a content filtering function according to an embodiment of the present invention.

With reference to FIG. 4B, a detailed description will hereinafter be given of a process of displaying a content list through a content filtering function.

When the number 3 key is selected in the standby screen state 410, the mobile terminal 100 displays one or more functions mapped to the number 3 key (440).

For example, the functions mapped to the number 3 key include a call connection to a telephone number set in an abbreviated number 3, a message transmission to the telephone number set in the abbreviated number 3, a search for a folder set in the abbreviated number 3, and a filtering of contents having a content type mapped to the number 3 key. Additionally, various functions including the above-stated functions may be set in the number 3 key.

As the content filtering function 444 is selected, the mobile terminal 100 displays a list of content having the music type mapped to the number 3 key (450).

Figure 5A:
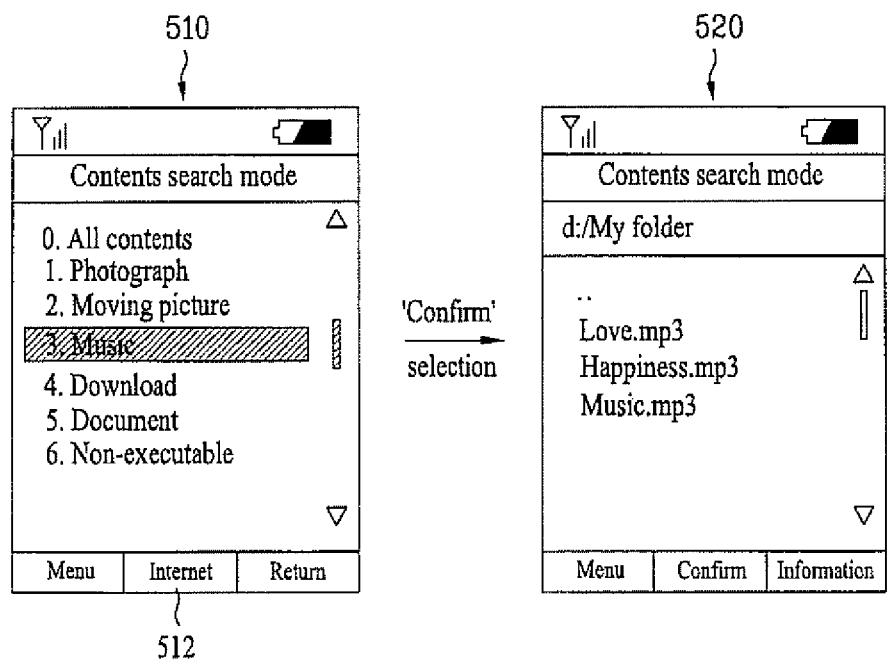
FIG. 5A depicts displays displaying a content list through a content type list according to an embodiment of the present invention.

With reference to FIG. 5A, a detailed description will hereinafter be given of a process of displaying a content list through a content type list.

The mobile terminal 100 displays a list of content types on the screen upon entering the content search mode (510). At this time, in the content type list, the mobile terminal 100 displays a key mapped to each content type together with the corresponding content type. Also, as the number 3 key is selected, the mobile terminal 100 discriminatively displays the music type mapped to the number 3 key.

When a confirm key 512 is selected in the state 510, then the mobile terminal 100 displays a list of contents having the music type mapped to the number 3 key on the screen (520).

Figure 5B:
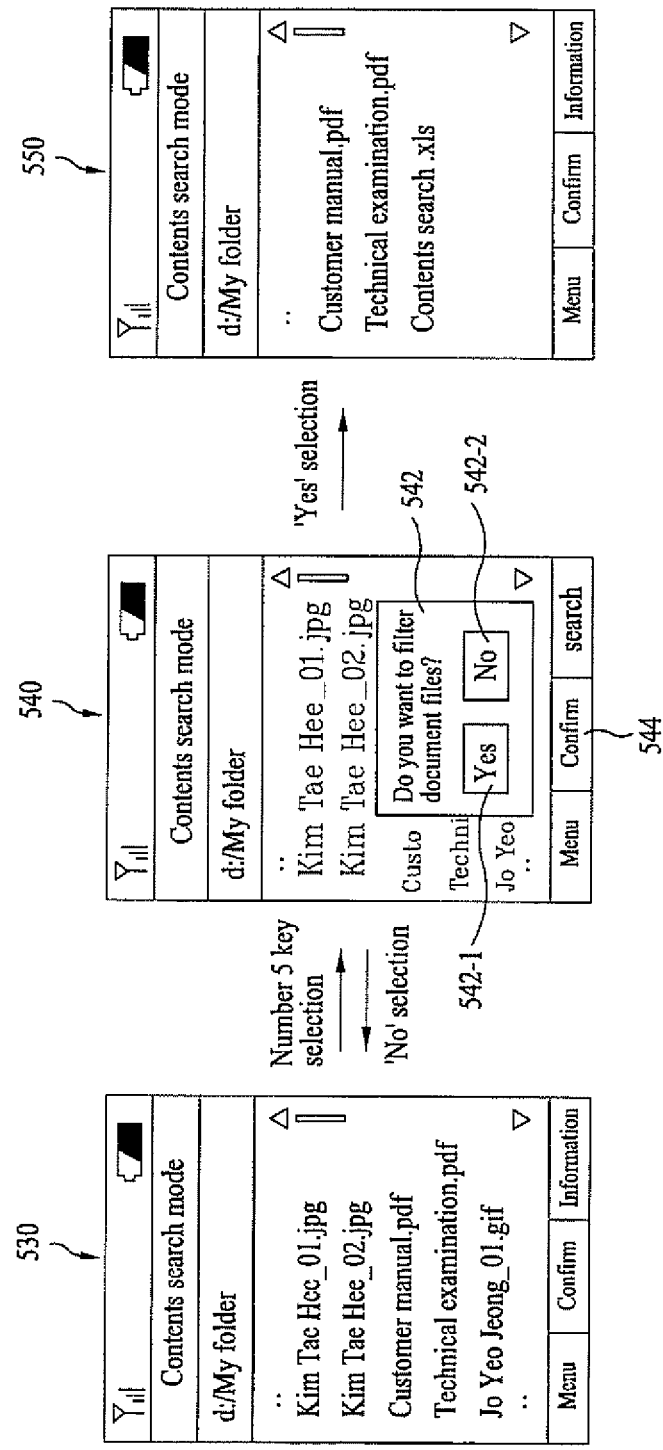
FIG. 5B depicts various displays displaying content lists after determining whether to perform the content filtering function according to an embodiment of the present invention.

With reference to FIG. 5B, a detailed description will hereinafter be given of a process of displaying contents lists after determining whether to perform the contents filtering function.

Upon entering the content search mode, the mobile terminal 100 displays a list of contents of all content types on the screen (530).

As the number 5 key is selected in the state 530, the mobile terminal 100 displays a window 542 to ask the user whether to filter contents of the document type mapped to the number 5 key (540). When 'Yes' (542-1) displayed in the window 542 is selected, the mobile terminal 100 displays a list of the contents of the document type mapped to the number 5 key on the screen (550).

Alternatively, when 'No' (542-2) displayed in the window 542 is selected in the state 540, the mobile terminal 100 returns to the state 530.

As apparent from the above description, the contents search method and the mobile terminal 100 with the contents search function according to the present invention has the following benefits.

First, because keys are mapped on a content type basis, contents having a specific content type can be simply and conveniently searched for by selecting a key mapped with the specific content type.

Secondly, contents can be searched on a content type basis. Therefore, it is possible to rapidly search for contents.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for displaying content in a mobile terminal, the method comprising:
displaying, on a display, a first content file list collectively including content files of a plurality of different content file types;
receiving first input from a user via a first specific key of a plurality of keys while the first content file list is displayed, wherein the first specific key is associated with a first content file type of the plurality of different content file types, and wherein the first content file list is displayed without displaying on the display first information that indicates that the first specific key is associated with the first content file type;

transitioning, responsive to the first input of manipulating only the first specific key, from displaying of the first content list directly to displaying, on the display, of a second content file list which only includes at least one content file corresponding to the first content file type which is associated with the first specific key;

receiving second input via a second specific key of the plurality of keys while the second content file list is displayed, wherein the second specific key is associated with all of the plurality of different content file types, and wherein the second content file list is displayed without displaying on the display second information that indicates that the second specific key is associated with all of the plurality of different content file types; and transitioning, responsive to the second input of manipulating only the second specific key, from displaying of the second content file list directly to displaying of the first content file list.

2. The method of claim 1, wherein displaying of the second content file list comprises content file filtering.

3. The method of claim 1, further comprising:
filtering the content files stored on the mobile terminal responsive to the first input to define the second content file list.

4. The method of claim 1, wherein displaying of the second content file list comprises displaying the second content file list in order of one of the most recent time of content file execution and frequencies of content file execution.

5. The method of claim 1, wherein the plurality of different content file types includes at least one of a photograph, music, moving picture, download, document, or a non-executable type.

6. The method of claim 1, wherein displaying of the second content file list comprises displaying of the second content file list in at least one of a Picture In Picture (PIP) mode, a pop-up mode, or an On Screen Display (OSD) mode.

7. The method of claim 1, further comprising:
transitioning from a first screen displayed on a display of the mobile terminal to a content display screen.

8. The method of claim 1, wherein displaying of the second content file list comprises displaying of the second content file list in at least one of a Picture In Picture (PIP) mode, a pop-up mode, or an On Screen Display (OSD) mode.

9. The method of claim 1, further comprising:
receiving third input via a third specific key of the plurality of keys;
displaying, responsive to the third input, one or more functions mapped to the third specific key, the one or more functions comprising at least a first function of filtering at least one content file corresponding to a second content file type associated with the third specific key;
receiving fourth input for selecting the first function from the one or more functions; and
displaying a third content file list which only includes the at least one content file corresponding to the second content file type associated with the third specific key.

10. A method for displaying content in a mobile terminal, the method comprising:
displaying, on a display, a first content file list collectively comprising content files of a plurality of content file types;
receiving a first request from the user while the first content file list is displayed, wherein the first request comprises user input via a first specific key of a plurality of keys, and wherein each key of the plurality of keys is associated with at least one content file type of a plurality of different content file types, and wherein the first content file list is displayed without displaying on the display first information that indicates that the first specific key is associated with the first content file type;

transitioning, responsive to the first request of manipulating only the first specific key, from displaying of the first content file list directly to displaying, on the display, a second content file list which only includes content files corresponding to a first content file type which is associated with the first specific key;

receiving, subsequently to the first request, a second request comprising user input via a second specific key of the plurality of keys while the second content file list is displayed, wherein the second specific key is associated with a second content file type of the plurality of different content file types, and wherein the second content file list is displayed without displaying on the display second information that indicates that the second specific key is associated with all of the plurality of different content file types; and transitioning, responsive to the second request of manipulating only the second specific key subsequently to the first request, from displaying of the second content file list directly to displaying of a third content file list which only includes content files corresponding to the second content file type which is associated with the second specific key.

11. The method of claim 10, wherein the first request comprises a single key input.

12. The method of claim 10, wherein displaying of the second content file list comprises content file filtering.

13. The method of claim 10, further comprising:
filtering the content files stored on the mobile terminal responsive to the first or second request to define the requested content file list.

14. The method of claim 10, wherein displaying of the second content file list comprises displaying the second content file list in order of one of the most recent time of content file execution and frequency of content file execution.

15. The method of claim 10, wherein the plurality of different content file types includes at least one of a photograph, music, moving picture, download, document, or a non-executable type.

16. A mobile terminal, comprising:
an input unit comprising a plurality of keys, wherein a first specific key of the plurality of keys is associated with a first content file type of a plurality of different content file types;
a display; and
a controller configured to:
cause the display to display a first content file list collectively including content files of the plurality of different content file types, wherein the first content file list is displayed without displaying on the display first information that indicates that the first specific key is associated with the first content file type;
receive first input via the first specific key of the plurality of keys while the first content file list is displayed;
cause the display to transition, responsive to the first input of manipulating only the first specific key, from displaying of the first content file list directly to displaying of a second content file list which only includes at least one content file corresponding to the first content file type which is associated with the first specific key;

receive a second input via a second specific key of the plurality of keys while the second content file list is displayed, wherein the second specific key is associated with all of the plurality of different content file types, wherein the second content file list is displayed without displaying on the display second information that indicates that the second specific key is associated with all of the plurality of different content file types; and cause the display to transition, responsive to the second input of manipulating only the second specific key, from displaying of displaying of the second content file list directly to displaying of the first content file list.

17. A mobile terminal, comprising:

an input unit comprising a plurality of keys, wherein the input unit is configured to receive input from a user via any key of the plurality of keys, and wherein each key of the plurality of keys is associated with at least one content file type of a plurality of different content file types; and a display; and a controller configured to:

cause the display to display a first content file list collectively including a plurality of content file types of content files;

receive a first request via a first specific key of the plurality of keys while the first content file list is displayed, wherein the first content file list is displayed without displaying on the display first information that indicates that the first specific key is associated with a first content file type;

cause the display to transition, responsive to the first request of manipulating only the first specific key, from displaying of the first content file list directly to a second content file list which only includes content files corresponding to the first content file type which is associated with the first specific key;

receive, subsequently to the first request, a second request via a second specific key of the plurality of keys while the second content file list is displayed, wherein the second specific key is associated with a second content file type of the plurality of different content file types, wherein the second content file list is displayed without displaying on the display second information that indicates that the second specific key is associated with the second content file type; and cause the display to transition responsive to the second request of manipulating only the second specific key subsequently to the first request while the second content file list is displayed without second information on the second specific key, from displaying the second content file list directly to displaying of a third content file list which only includes content files corresponding to the second content file type which is associated with the second specific key.

* * * * *